United States Patent [19]
Hunt et al.

[11] Patent Number: 4,887,698
[45] Date of Patent: Dec. 19, 1989

[54] BRAKE ACTUATOR

[75] Inventors: Timothy J. Hunt, Gwent; Hadyn L. Craske, Cardiff, both of Great Britain

[73] Assignee: Lucas Industries Public Limited Company, Birmingham, England

[21] Appl. No.: 227,873

[22] Filed: Aug. 3, 1988

[30] Foreign Application Priority Data

Aug. 27, 1987 [GB] United Kingdom ................. 8720203

[51] Int. Cl.⁴ ............................................. F16D 51/22
[52] U.S. Cl. .................................... 188/325; 188/341; 192/75; 192/99 B
[58] Field of Search ............... 188/326, 327, 328, 331, 188/333, 336, 337, 106 F, 106 A, 341, 79.54, 78, 325; 192/75, 99 B

[56] References Cited

U.S. PATENT DOCUMENTS

| | | | |
|---|---|---|---|
| 2,006,494 | 7/1935 | Bendix et al. | 188/328 |
| 2,252,860 | 8/1941 | Porsche | 188/78 X |
| 2,469,826 | 5/1949 | Irving | 188/78 |
| 2,918,147 | 12/1959 | Shaven | 188/78 |
| 3,554,330 | 1/1971 | Harrison | 188/341 |
| 4,757,882 | 7/1988 | Idesawa | 188/106 A X |

FOREIGN PATENT DOCUMENTS 476812 4/1975 Australia ............................ 188/331

Primary Examiner—George E. A. Halvosa
Attorney, Agent, or Firm—Fleit, Jacobson, Cohn, Price, Holman & Stern

[57] ABSTRACT

A mechanical brake actuator for a shoe drum brake including a pair of brake shoes carried by a back plate wherein one pair of adjacent ends of the shoes engage an abutment fixed relative to the back plate, comprises an assembly including a pair of pivotally interconnected parts for co-action respectively with the brake shoes, one part being a force-applying lever engaging one shoe and the other part engaging the other shoe and extending therefrom to the lever to form a pivot member pivotally interconnecting the lever and strut, a pair of rollers on the pivot member, an opening in the abutment, and a pair of spaced surfaces on the abutment on opposite sides of the opening, the rollers being in rolling engagement with the spaced surfaces, and the lever and strut being movably disposed in the opening so that force applied the lever in one direction to pivot the lever about the pivot member urges the one shoe into engagement with the drum and urges the strut to displace the other shoe into engagement with the drum.

12 Claims, 3 Drawing Sheets

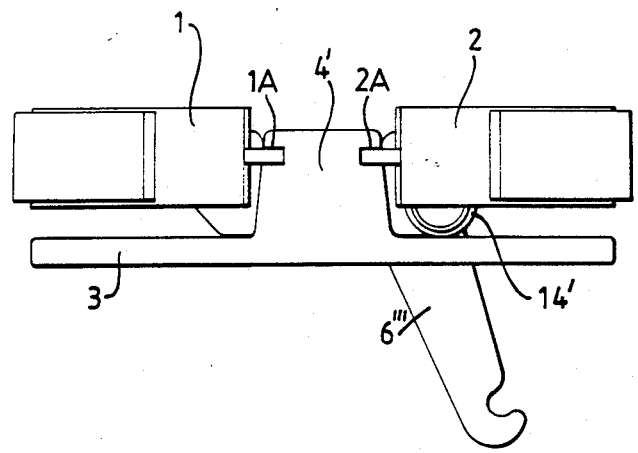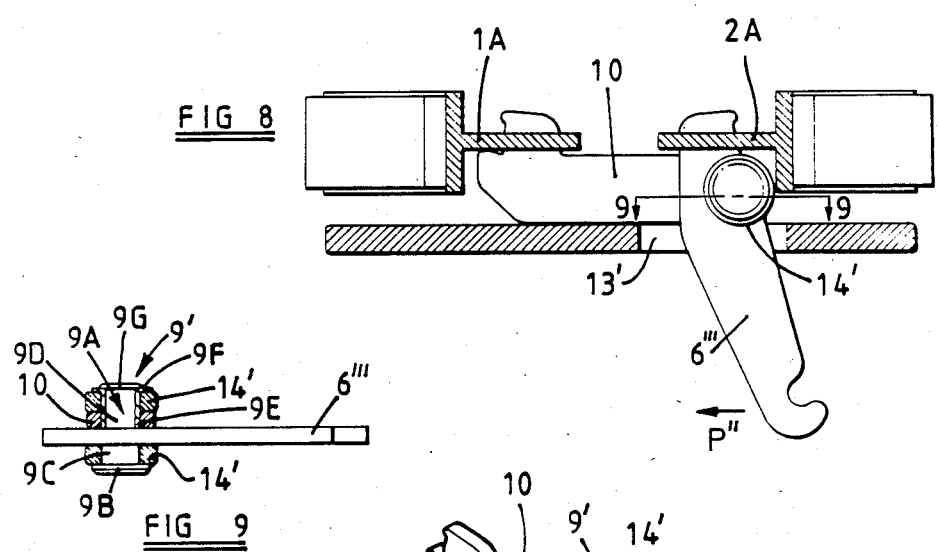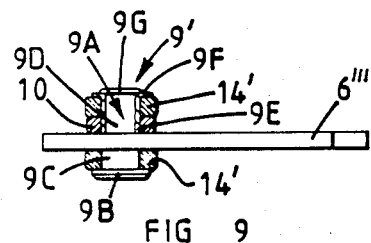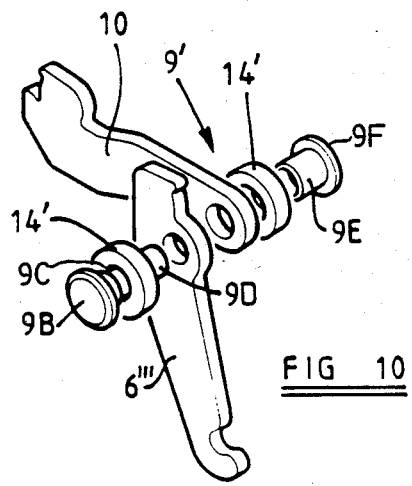

BRAKE ACTUATOR

BACKGROUND OF THE INVENTION

The invention relates to a mechanical brake actuator for a shoe-drum brake, primarily intended to function as a vehicle parking actuator for maintaining the brake in operative condition when the vehicle is left unattended.

In one known form of such an actuator, a force input lever and strut member are pivotally interconnected and adapted for engagement respectively with outer end portions of the shoes of a drum brake, the actuator being expandible by application of force to the lever in order to apply the shoes to the brake drum for parking purposes in known manner. In this known actuator, portions of the lever and strut member are supported for sliding movement parallel to the brake backplate on surfaces fixed relative to the backplate, in order to react forces generated in these components in one direction perpendicular to the backplate. Such sliding movement can, however, be undesirable in that it tends adversely to affect the brake efficiency.

It is also known to provide a one-piece mechanism in the form of a strut which engages the webs of a pair of brake shoes, the strut being pivotable in order to expand the shoes and being supported on a surface of a fixed abutment member by way of a roller engaging a surface of said member adjacent the brake backplate.

BRIEF SUMMARY OF THE INVENTION

An object of the present invention is to provide a two-part mechanical brake actuator for a shoe drum brake of simple and convenient form and capable of more efficient operation than some known two-part mechanisms. According to the invention, a mechanical brake actuator for a shoe drum brake comprises an assembly including a pair of pivotally interconnected parts for co-action respectively with the brake shoes, one part being connectable to force applying means and the other extending, in use, between its associated shoe and said one part to form a strut, the parts being pivotally interconnected by a pivot member which carries at least one roller arranged to engage, in use, a surface fixed relative to a backplate carrying the shoes.

In one convenient arrangement, the fixed surface engaged by the roller is spaced inwardly from the the backplate, being conveniently on an abutment member on the backplate and engageable by the adjacent shoe ends. Typically, in such an arrangement, the fixed surface is at the side of the shoe webs remote from the backplate.

Preferably, the abutment member provides a longitudinal slot which receives part of at least the strut therein, in use. A pair of rollers may then be carried by said pivot member and arranged at either side of the actuator assembly, the rollers respectively engaging surfaces of the abutment member at either side of the slot therein.

Typically, the pivotal axis between the two actuator parts lies between the locations of engagement, in use, between these parts and the respective shoes.

In an alternative arrangement, the fixed surface is at the side of the shoe webs adjacent the backplate and may conveniently be a surface of the backplate.

BRIEF DESCRIPTION OF THE DRAWINGS

The invention will now be described, by way of example, with reference to the accompanying drawings wherein:

FIG. 7 is a view similar to FIG. 2 showing a further embodiment of the invention;

FIG. 8 is a cross sectional view of the further embodiment of the invention shown in FIG. 7;

FIG. 9 is a cross sectional view taken along line IX-IX of FIG. 8; and

FIG. 10 is a view similar to FIG. 3 showing the embodiment of FIG. 7.

DETAILED DESCRIPTION

Figure 1:
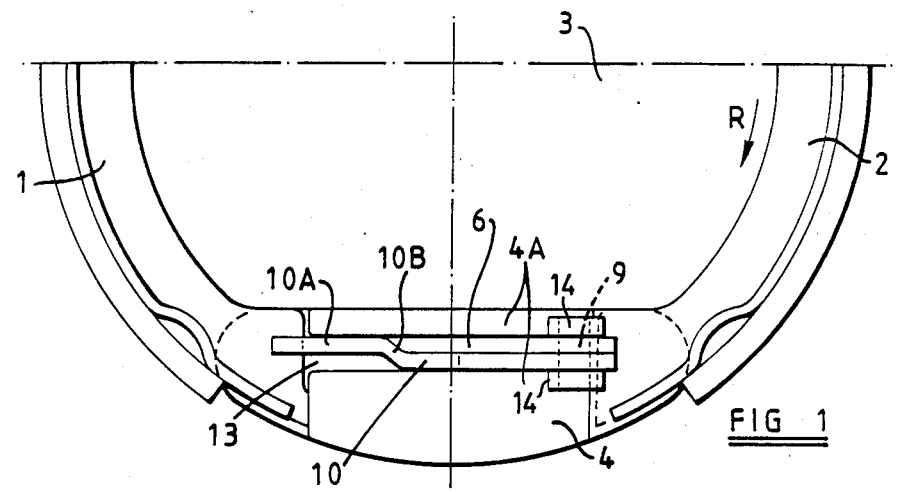
FIG. 1 is an end elevational view of part of an internal shoe drum brake embodying the actuator of the invention.
Figure 2:
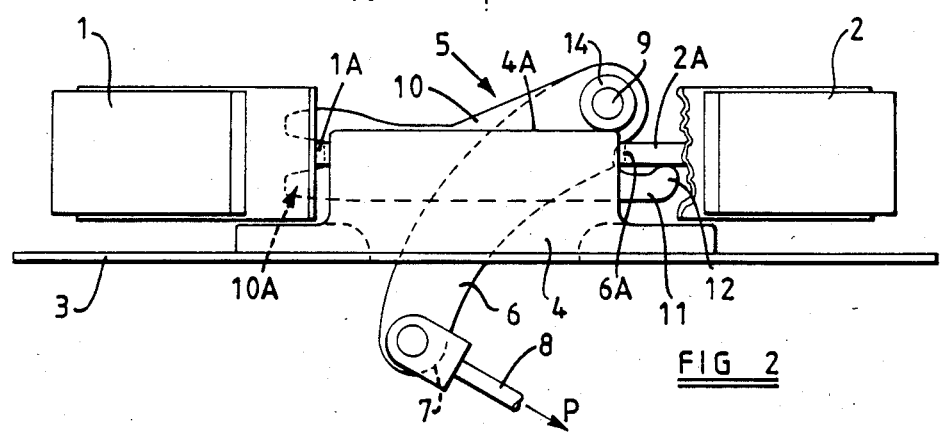
FIG. 2 is a bottom plan view of FIG. 1.

Referring to FIGS. 1 and 2, these show part of an internal shoe drum brake in which a pair of brake shoes 1, 2 are mounted on a backplate 3, the backplate also mounting a fixed abutment member 4 against which the adjacent ends of the shoes 1 and 2 may come into engagement. The aforesaid shoe ends are engaged by a mechanical actuator assembly, indicated generally at 5, arranged to actuate the brake for parking and/or emergency braking purposes. The arrangement illustrated would typically be incorporated in a drum brake used solely as a parking brake e.g. of the duo-servo type, the brake drum (not shown) with which the shoes co-operate being provided with a radially extending peripheral disc element which is clamped by a conventional form of disc brake for service braking purposes.

Figure 3:
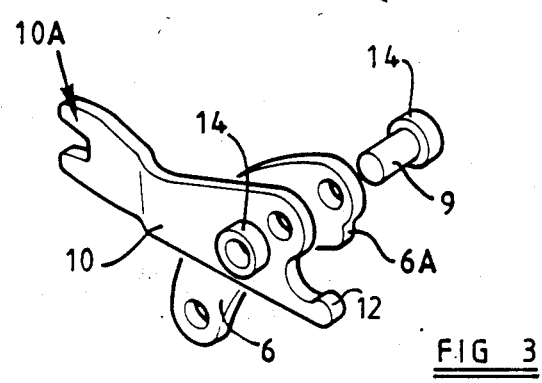
FIG. 3 is an exploded perspective view of part of FIGS. 1 and 2.

The actuator 5 includes an actuator lever 6 arranged in a "forward-pull" configuration and to one end of which is pivotally coupled a clevis 7 from which extends an actuating cable or the like 8 for connection to a conventional hand brake lever within the vehicle. The lever 6 is pivotally connected, by way of a pin 9 to a strut element 10 and the assembly 5 is arranged with the lever 6 in engagement with the web 2A of the shoe 2 at a pivot location 6A of the lever (FIGS. 2 and 3); a forked free end portion 10A of the strut element 10 embraces and engages the web 1A of the shoe 1. The other end portion of the strut carries a projection 11, of which a rounded end portion 12 engages the underside of the web 2A in order to provide additional support for the associated shoe.

The abutment device 4 is provided with a longitudinal slot 13 which receives the strut element 10 therein, as well as a large part of the lever 6 which extends through an opening at the base of the abutment device and a corresponding opening in the backplate 3 for connection to the actuating cable 8, as aforesaid. The strut 10 is cranked at 10B so that the forked end portion 10A bears against one side of th slot and the remaining longitudinal part of the strut bear against the other side of the slot.

The pin 9 which pivotally interconnects the strut 10 and lever 6 carries a pair of rollers 14 which are mounted at the respective ends of the pin at the outside of the strut and lever assembly and which bear upon respective upper surface portions 4A of the abutment member 4 on opposite sides of slot 13.

The actuator described operates as follows. The shoe webs 1A and 2A are normally urged into engagement with the fixed abutment 4 by shoe return springs (not shown). When an actuating force is applied to the lever 6 by a pull exerted on the cable 8 in the direction indicated by the arrow P, an actuating force is applied to the shoes 1 and 2 by way of the pivot location 6A of the lever and the pin 9 of the lever and strut assembly, causing both shoes to be moved outwardly towards the drum through the normal shoe to drum clearance, until the shoes are applied against the drum. Assuming that the tendency is for the drum to rotate in the direction indicated by the arrow R, the application of the shoe 2 against the drum will result in forces derived from the rotating drum moving this shoe circumferentially into firm engagement with the abutment 4, which movement will be transferred via the actuator assembly 5 to the shoe 1, with resultant movement of the rollers 14 which roll along the surfaces 4A with low frictional losses, enabling the brake to act in a very efficient manner. The brake components move back, under the action of shoe return springs (not shown), to generally their illustrated positions when the pull is released from the cable 8.

It the tendency is for the drum to rotate in the opposite direction to that indicated by arrow R, then the shoe 1 would move to abut the fixed abutment 4. Because the distance between the fixed abutment at 1A and the pivotal axis of pin 9 is constant, any circumferential movement of the shoe 2 will be accompanied by rotation of the lever 6 about the pin 9 without any rolling of the rollers 14.

Figure 4:
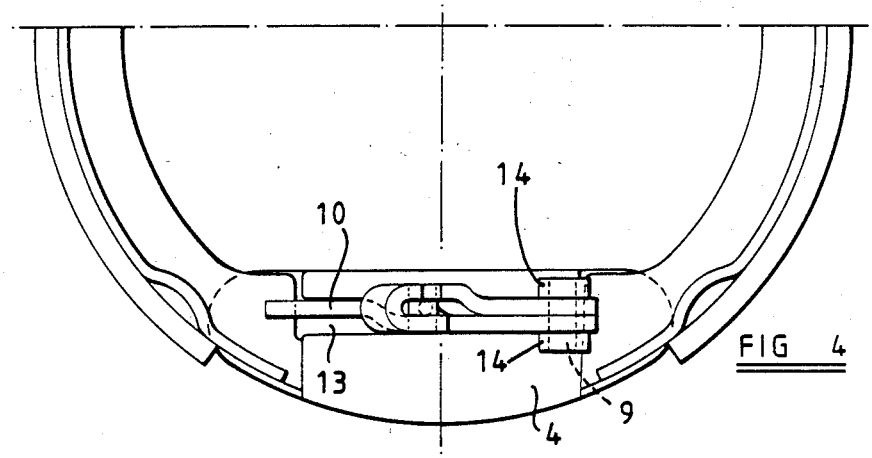
FIGS. 4 to 6 are views corresponding to FIGS. 1 to 3, respectively, but of an alternative form of mechanical actuator of the invention incorporated in a drum brake.
Figure 5:
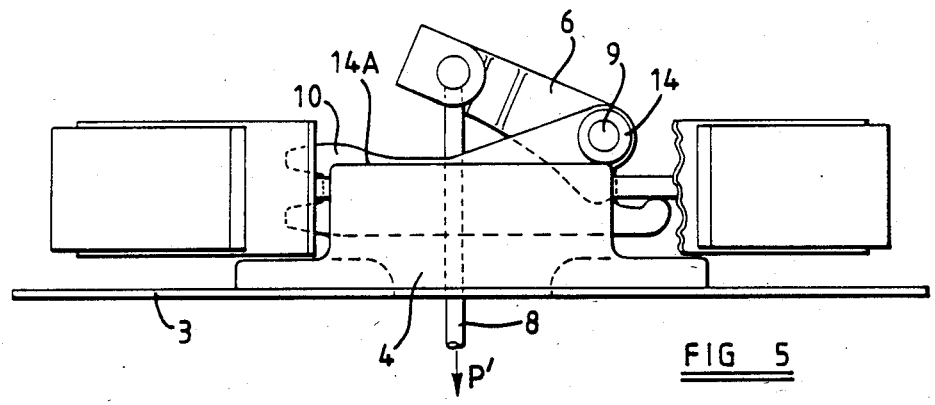
Figure 6:
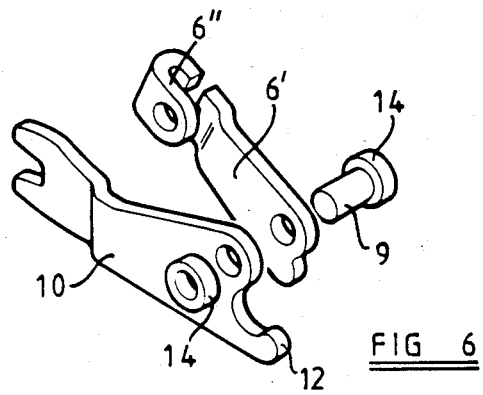

The alternative arrangement illustrated in FIGS. 4 to 6 is generally similar to that of the previous embodiment, but is adapted for "cross-pull" operation. For this purpose, the lever 6', which is again pivotally connected, by a pin 9 to the strut 10 is somewhat foreshortened and is bent back on itself at 6" to provide for the connection of the actuating cable 8, the cable being positioned approximately midway along the abutment member 4 and the cable extending through the abutment member and backplate for connection to a convenient actuating device, such as a hand brake lever. The actuating force, in this embodiment, is applied perpendicularly to the backplate 3, as indicated by the arrow P'. The strut 10 is again housed largely within a slot 13 of the abutment member 4 with the lever 6" this time projecting almost entirely outwardly from the abutment. The pin 9 once again carries rollers 14 which rest on upper surfaces 14A of the abutment member 4. Upon the application of actuating force along the cable 8 to the lever 6", actuation of the brake occurs in substantially similar manner to that described with reference to FIGS. 1 to 3.

FIGS. 7 to 10 illustrate a further alternative embodiment of the invention which is a "forward-pull" arangement in which the actuator is again formed by a strut element 10 to which a lever 6'" is pivotally connected by a pivot pin assembly 9' carrying a pair of rollers 14', the strut and lever, respectively, engaging adjacent shoe webs 1A and 2A. An abutment member 4' is provided integrally with a backplate 3 and is engageable by the adjacent ends of a pair of brake shoes 1, 2. The lever extends through a slot 13 in the backplate and the rollers are positioned to engage the backplate on opposite sides of the slot. When actuating force is applied to the lever 6'" in the direction of arrow P", the brake is actuated in the manner described in connection with the previous embodiments, with the rollers moving as required along the backplate while forces imposed by the actuator move each brake shoe in a direction toward the drum.

It will be seen that the positioning of the rollers at the inner side of the shoe webs in this embodiment produces a lever ratio of about 3:1 which is particularly suitable for actuation of a duo-servo parking brake of the kind illustrated. It also minimizes any tendency for the shoes to lift away from the backplate during actuation.

As will be seen more clearly from FIGS. 9 and 10, the pivot pin assembly 9' includes a pin 9A having a head 9B and a bearing portion 9C of diameter such as to fit closely within the adjacent roller 14'. The pin also has a portion 9D of smaller diameter dimensioned axially to extend through the entire assembly beyond the adjacent other roller 14', a bushing 9E being inserted from the opposite direction to surround the pin portion 9D and act as a bearing for the other roller 14', strut 10 and lever 6. The free end of the pin projects initially beyond an end flange 9F of the bushing and is peened over at 9G against this flange to hold the assembly together.

Not only does the provision of the rollers 14, or similar alternative roller devices, contribute towards increased efficiency of the actuator, as compared with some conventional arrangements, but the use of the pin 9 for the dual purpose of pivotally interconnecting the lever 6 and strut 10 and also of mounting the rollers 14, results in a simple and convenient practical arrangement.

It will be understood that the actuator of the invention may be used with any form of shoe drum brake, the various components being modified as appropriate according to the particular form of brake chosen.

I claim:

1. A mechanical brake actuator for a shoe drum brake wherein a pair of shoes are movably mounted on a back plate and have adjacent ends engageable with an abutment fixed relative to the back plate, the actuator comprising:
    an opening in the abutment;
    a pair of spaced surfaces on the abutment on opposite sides of said opening;
    a pair of actuator parts for co-action respectively with the brake shoes, one part being engageable with one brake shoe and being connectable to force applying means, and the other part being a strut engageable with the other brake shoe and being pivotally connected to said one part;
    a pivot member pivotally interconnecting said actuator parts;
    a pair of rollers rotatably mounted on said pivot member and in rolling engagement respectively with said spaced surfaces; and
    at least one of said actuator parts having at least a part thereof movably disposed in said opening, so that actuating force applied on said one part moves the brake shoes apart towards engagement with the drum.

2. The brake actuator as claimed in claim 1 wherein: said one actuator part extends through said opening in the abutment in a direction substantially perpendicular to the back plate.

3. The brake actuator as claimed in claim 1 wherein: said one actuator part is positioed with respect to the abutment so that the direction of actuating force applied thereto extends through said opening in the abutment and perpendicular to the back plate.

4. The brake actuator as claimed in claim 3 wherein:
the abutment is mounted on the back plate and extends between the adjacent ends of the brake shoes;
said one actuator part is entirely on the side of the back plate on which the abutment is mounted; and
a further opening is provided in the back plate aligned with said opening in the abutment, said direction of actuating force extending through said further opening.

5. The brake actuator as claimed in claim 1 and further comprising:
a further opening in the back plate aligned with said opening in the abutment, said at least one of said actuator parts having at least a part thereof movably disposed in said further opening; and wherein
said opening in the abutment comprises a slot portion; and
at least part of said at least one of said actuator parts extends in said slot.

6. The brake actuator as claimed in claim 5 wherein:
at least a part of both of said actuator parts are movably disposed in said slot in the abutment.

7. The brake actuator as claimed in claim 6 wherein:
the abutment is mounted on the back plate; and
said pair of spaced surfaces are on a side of the abutment facing substantially away from the back plate.

8. The brake actuator as claimed in claim 7 wherein:
the abutment extends from the back plate between the adjacent ends of the brake shoes.

9. The brake actuator as claimed in claim 1 wherein:
at least a part of both of said actuator parts are movably disposed in said opening in the abutment.

10. The brake actuator as claimed in claim 1 wherein:
said opening in the abutment comprises a slot portion having side walls facing each other; and
at least a part of said strut extends in said slot and has offset portions extending in substantially parallel planes, one surface of one offset portion engaging one of said side walls, and one surface of the other offset portion engaging the other side wall.

11. The brake actuator as claimed in claim 10 wherein:
said one actuator part extends between one of said offset portions of said strut and the side wall engaged by the other offset portion of said strut.

12. The brake actuator as claimed in claim 1 wherein:
the pivotal axis of said pivot member lies in a plane extending between the positions of engagement of said actuator parts with the respective shoes.

* * * * *